(12) United States Patent
Loftin et al.

(10) Patent No.: US 9,527,567 B1
(45) Date of Patent: Dec. 27, 2016

(54) MARINE ENGINE DRAINAGE AND COOLANT MONITORING SYSTEM

(71) Applicants: Scott P Loftin, Carrollton, TX (US); Michael P Armstrong, Carrollton, TX (US)

(72) Inventors: Scott P Loftin, Carrollton, TX (US); Michael P Armstrong, Carrollton, TX (US)

(73) Assignee: PRESTON HOLDINGS, INC., Carrollton, TX (US)

( * ) Notice: Subject to any disclaimer, the term of this patent is extended or adjusted under 35 U.S.C. 154(b) by 726 days.

(21) Appl. No.: 13/770,874

(22) Filed: Feb. 19, 2013

Related U.S. Application Data

(60) Provisional application No. 61/599,857, filed on Feb. 16, 2012.

(51) Int. Cl.
*F01P 11/02* (2006.01)
*B63H 21/38* (2006.01)
*F16K 5/04* (2006.01)

(52) U.S. Cl.
CPC ............... *B63H 21/383* (2013.01); *F16K 5/04* (2013.01)

(58) Field of Classification Search
CPC ..... F01P 11/02; F01P 11/0276; F01P 2023/08; F01P 2031/00; F01P 2031/18; F01P 2031/20; F01P 2031/22; F01P 2031/24; F01P 11/06; F01P 2011/065; F01P 2011/066; F01P 3/202; F01P 3/205
See application file for complete search history.

(56) References Cited

U.S. PATENT DOCUMENTS

| | | | |
|---|---|---|---|
| 578,142 A | 3/1897 | Fierz | |
| 1,962,932 A | 6/1934 | Mather, Jr. | |
| 2,536,374 A | 1/1951 | Kincannon | |
| 2,857,892 A | 10/1958 | Hulsebus | |
| 4,336,821 A * | 6/1982 | Frantz | B61C 17/02 137/187 |
| 4,512,294 A | 4/1985 | Mohr | |
| 4,693,690 A * | 9/1987 | Henderson | F01P 11/0276 114/183 R |
| 4,758,190 A | 7/1988 | Van Vuren | |
| 5,069,259 A | 12/1991 | Ahlefeld | |
| 5,178,567 A | 1/1993 | Mondek | |
| 5,263,885 A | 11/1993 | Montague | |
| 5,362,265 A | 11/1994 | Gervais | |
| 5,579,727 A | 12/1996 | Logan et al. | |
| 5,628,285 A * | 5/1997 | Logan | F01P 11/0276 123/41.14 |
| 5,671,906 A | 9/1997 | Rosen | |
| 5,937,802 A | 8/1999 | Bethel et al. | |

(Continued)

*Primary Examiner* — Hung Q Nguyen
(74) *Attorney, Agent, or Firm* — Handley Law Firm, PLLC

(57) ABSTRACT

A marine engine quick drain system consisting of multiple drainage tubes connecting each drainage point on the engine to a drainage device. The drainage device is operable to drain water from all drain ports within the engine simultaneously. Fittings are provided to connect each drainage tube to each drainage point on the engine. Integrated within each fitting is a fluid sensor which indicates the presence of water in each part of the engine. Each sensor is connected back to a central control console having a microprocessor which will control the drainage device and verify that the engine has been drained properly or if there is water in the engine.

16 Claims, 11 Drawing Sheets

(56) References Cited

U.S. PATENT DOCUMENTS

| | | | |
|---|---|---|---|
| 5,970,926 A | 10/1999 | Tsunoda et al. | |
| 6,050,867 A * | 4/2000 | Shields | B63B 13/02 |
| | | | 114/183 R |
| 6,053,784 A | 4/2000 | Takahashi | |
| 6,089,934 A | 7/2000 | Biggs et al. | |
| 6,165,033 A | 12/2000 | Cugini | |
| 6,260,517 B1 * | 7/2001 | Powers | F01P 3/205 |
| | | | 123/41.15 |
| 6,343,965 B1 | 2/2002 | Biggs et al. | |
| 6,390,870 B1 | 5/2002 | Hughes et al. | |
| 6,510,862 B2 | 1/2003 | Prentice | |
| 6,565,398 B1 | 5/2003 | Walczak | |
| 7,025,643 B1 | 4/2006 | Csitari | |
| 7,438,613 B2 * | 10/2008 | Hubbs | F01P 3/205 |
| | | | 440/88 C |
| 7,585,196 B1 | 9/2009 | Jaeger | |

* cited by examiner

MARINE ENGINE DRAINAGE AND COOLANT MONITORING SYSTEM

CROSS-REFERENCE TO RELATED APPLICATIONS

The present invention claims priority as a continuation-in-part regular utility patent application to Application Ser. No. 61/599,857, invented by Scott P. Loftin and Michael P. Armstrong, entitled "Marine Engine Drainage and Coolant Monitoring System," and filed on 16 Feb. 2012.

TECHNICAL FIELD OF THE INVENTION

The present invention relates in general to inboard marine motors, and in particular to a system for draining water used as coolant from inboard marine motors.

BACKGROUND OF THE INVENTION

Most marine inboard engines for small boats are marinized versions of automotive engines. Typically, these engines use open cooling systems which take in water from the body of water the boat is in, and circulate that water through a water jacket surrounding the engine to cool the engine. When the boat is not in use, the water is trapped in the cooling system inside of the engine. During winter months the engine water must be drained to prevent it from freezing, expanding and cracking the engine. Additionally, the engine water also causes corrosive damage to the engine when left inside between regular operations. If it were easy to drain the engine, the water could be drained after every use to prevent rust and scale from developing inside the water jacket of the engine.

In any climate where the air temperature falls below the freezing temperature of the lake water, the owner typically drains and winterizes the engine and the boat cannot be used until there is no possibility of freezing weather. This causes an inconvenience to those who would like to use their boat during winter months. An invention that would make it easy for the average consumer to drain their engine would not only make it more convenient for people to use their boat in areas where it gets down to freezing a couple months out of the year, but would also open up the market for this type of boat to colder areas. An additional advantage of easy drainage is compliance with new laws in some states requiring drainage of the engine and other water reservoirs from the boat whenever the boat is moved from one lake to another in an effort to prevent the spread of invasive aquatic species such as zebra mussels.

Several quick drain systems already exist, but none of them have a way of verifying that they have functioned properly and thoroughly. Without a way of verifying that the drain has functioned properly, there is no way of knowing if there is still water left in the engine. This could result in costly repairs and is a liability to the manufacturer of the drainage system and the manufacturer of the engine should they allow this type of system to be mounted to their engines. However, with a way of verifying, the end user and the manufacturer can rest assured that the boat is safe and ready to use year round.

Furthermore, currently the only way to check that the engine cooling system is working properly is the thermometer. If the coolant system is working properly the thermometer will display an engine temperature that is within certain parameters specified by the engine manufacturer, usually in the engine manual. If the coolant system is not working properly, the only way of knowing is when the thermometer reads above normal. However, by the time the thermometer reads above normal the engine is already overheating. To make things worse, by the time the average boat owner notices that the temperature is above normal, the boat is already being operated outside of the boathouse, away from the dock or boat launch, and the driver must either risk further overheating of the engine by driving back or play it safe and turn the engine off and paddle or swim the boat back. The manufacturer designs the engine operating temperatures with a factor of safety to allow for delayed detection of cooling system problems without immediate damage. However, if there was a way of monitoring the engine cooling system, the boat operator would be notified that the engine is not working properly before it over heats and before the boat leaves the boat house or dock. Additionally, this ability for early detection would allow for the engine manufacturer to reduce the factor of safety thus allowing them to further optimize engine performance.

Valves currently available on the market typically are single port valves that control flow through one inlet and one outlet only. There are multiport valves, although most are used to divert flow or mix fluids. There are no available options for draining multiple ports simultaneously while keeping the fluids separate when the valve is closed. The option of using multiple valves that can be actuated individually is viable, however this quickly becomes expensive especially when using electric valves.

When draining multiple sources of fluid, the goal is to pass the fluid through a bulkhead, such as the hull of a boat or the wall of a container. The standard pipe fittings that pass through a bulkhead use NPSM thread (National Pipe Straight Thread for Free-Fitting Mechanical Joints). This thread allows the fitting to be secured to the bulkhead using a lock nut on the backside of the bulkhead, but it provides a difficult joint to attach to since valves use NPT (National Pipe Tapered Thread). In order to drain multiple hoses through one bulkhead fitting, multiple valves would have to attach to a manifold to collect the fluid. Then the manifold would have to attach to the bulkhead fitting through a hose and an adapter fitting or an oversized hose that could fit over the bulkhead fitting and tighten using a hose clamp that would provide an imprecise connection. Another issue confronting automated drainage is the presence of fluid at the output of the valve. If there is fluid at the output of the valve before it opens, then the inlet fluid will not be able to flow through the valve as desired once it is opened. A sensor that could detect fluid at the output would be very beneficial to allow for the output to be cleared before attempting to drain.

SUMMARY OF THE INVENTION

A novel marine engine drainage and coolant monitoring system that consists of fittings that attach to each part of the engine cooling system that must be drained, engine block, exhaust manifold, transmission and hoses, and hose attachments thereto, linking areas of the engine that must be drained to a single drainage device to provide quick and easy drainage of the engine. Additionally, located at each fitting is a water sensor that communicates with a central control module to ensure proper drainage of the engine and proper functionality of the engine cooling system during normal engine operation.

The drainage valve device may be a valve, plug, or packer assembly that is actuated mechanically such as by handle or cable, electrically, hydraulically, or pneumatically. However, when disposed in the closed position the drainage valve device should prevent the fluid cross flow between each of the drain ports for the engine. If the fluid is not maintained separately then the fluid can flow from the engine block to the exhaust manifolds circumventing the engine thermostat and causing the engine to operate at an undesired temperature. So to ensure proper engine functionality, a drainage collector such as seen in the patent to Hubbs, et al., U.S. Pat. No. 7,438,613, cannot be used because the fluid in the drain hoses mixes upstream of the valve, but a drainage device such as seen in the patent to Henderson, et al., U.S. Pat. No. 4,693,690, can be used because the fluid in the drain hoses does not mix until after the stopper is removed.

Since drainage of the engine is powered by the force of gravity, the drainage device must be located at the lowest point in the boat's hull, below all parts of the engine that require drainage. The hoses connecting the drain fittings to the drainage device must maintain a downward slope as to not trap any water within the system. The drainage device can be secured in place to the boat structure, to make it a stable and stationary installation, to ensure no damage to the boat or device during normal boating operations. Preferably, the drainage device should be connected to a through hull opening, such as that used by the engine to intake water from the lake or that used by the bilge pump to remove water from the lower parts of the inside of the hull. In that way the water will be drained outside of the hull to prevent more water from accumulating inside the hull of the boat than what is experienced from normal operation of the boat. The drainage device can also be installed inside the bilge which will not require any additional holes through the hull, but will drain all cooling water into the bilge.

Integrated within each of the engine block, exhaust manifold, transmission and hose drainage fittings is a fluid sensor which will detect the presence of water in each compartment of the cooling system. These sensors must be made from materials that are heat resistant to engine operating temperatures as well as corrosion resistant to lake water and chemicals that could be in the engine water. The fluid sensors do not necessarily have to be integrated with the fittings since the engine manufacturer has the option of drilling new holes in the engine next to the fitting location where the sensors can be mounted to be able to detect engine water. Electrical wires connect each of the sensors to a central control that can be operated by the boat owner or to the engines computer to be controlled automatically.

A central control module console is provided for monitoring the fluid sensors. The console will preferably be powered by the battery of the boat. The console will have a power switch to turn the system on and off, a second switch to manually control the draining device, and a single indicator light for each sensor. The console will also preferably have a processor, memory, and a dip switch located within the console to select between whether the drainage device is installed in a through-hull configuration or an in-bilge configuration, and to determine the number of fluid sensors which are being be used. When the power switch is turned on it will send electricity to each of the sensors. If there is water in the part of the cooling system where each sensor is located, it will complete the electrical circuit and the light for that particular section will light up indicating there is water in that part of the engine. After the drainage device is actuated and all the water has drained from the engine, there will no longer be water to complete the electrical circuit with each sensor and each light will turn off. If one light does not turn off it indicates that the drainage system did not work properly and there is a problem with that particular section.

The console will have the ability to make sure that the cooling system is functioning properly while the boat is running. If the electrical circuit from one of the sensors is not closed by the presence of water, it will indicate to the console that coolant water is not reaching that part of the engine. It would also be beneficial to have a flow rate sensor in-line with the hose coming off of the raw water intake to make sure that water is flowing through the engine and not just sitting, getting hotter. The console can then set off an alarm or warning to the boat operator letting them know that one or more sections of the engine is not getting circulation and the engine could therefore over heat and damage could occur.

The console preferably has a data processor which has a data output allowing the console to communicate with the engine's computer or any other onboard computing devices. This way the engine manufacturer can use this information to further optimize engine performance and the boat manufacturer can display information from the console on boat dashboard displays.

A through hull installation of the drainage device preferably allows the engine to drain itself every time the engine is turned off by actuating the drainage device to the opened position and draining all necessary sections of the engine, preventing corrosion, rust and scale, and the potential for the engine water to freeze in cold temperatures. The drainage device will have to be actuated electronically so that the engine can automatically actuate the device when the engine is turned off. A boat in water sensor located at the through hull fitting will verify that the boat is out of the water and prevent the drainage device from opening while the boat is in the water. If all of the parts of the engine do not drain properly in the right amount of time, the console will be able to check each sensor and determine which part of the engine is not draining properly. The console can then set off an alarm letting the boat operator know that the engine has not drained properly, and which part of the engine is the problem.

An in-bilge installation of the drainage device will preferably be manually actuated since there will be no additional hole in the hull for a boat in water sensor. The console will then continue the drainage procedure, check all of the sensors for water, and set off an alarm if an area did not drain properly.

A drain valve is provided which preferably connects multiple inlets to one output and seals all inlets simultaneously using an expansion plug. The single valve is operable to drain fluid from all ports at the same time by unloading the expansion plug and removing it from obstructing the ports. The plug may be linearly actuated, rotary actuated, or screw actuated. The inlets are threaded with tapered pipe thread to accept standard pipe fittings. The outlet through the bottom of the valve body is threaded with NPSM straight pipe thread to attach directly to standard through bulkhead pipe fittings. The valve body houses a fluid sensor in the outlet to allow the controls to detect fluid blocking the outlet before the valve opens which would prevent drainage.

The valve closes using an expansion plug to block all of the inlets. This keeps the fluid flow from each hose separate when it is in the closed configuration. To open the valve, the plug is decompressed and pulled up and out of the way providing large, unobstructed pathways for the fluid to flow out of the valve.

A linear electric actuator can be used to power the valve, or it can be operated manually using a threaded stem similar to a globe valve that is typically used for garden hose spigots. Fluid from all of the inlets collects at the center of the valve and drains down through the outlet in the bottom of the valve body. The outlet is threaded with NPSM straight thread to allow the valve body to attach directly to a through bulkhead pipe fitting.

DESCRIPTION OF THE DRAWINGS

For a more complete understanding of the present invention and the advantages thereof, reference is now made to the following description taken in conjunction with the accompanying Drawings in which

FIG. 1 is a schematic view of the engine, the transmission, and the marine engine drainage and coolant monitoring system according to the present invention;

FIG. 2 is an enlarged view of one of the engine block fitting assemblies;

FIG. 3 is a longitudinal sectional view of the engine block fitting assembly;

FIG. 4 is a longitudinal section view of a fluid sensor insert of the engine block fitting assembly;

FIG. 5 is an exploded view of the fluid sensor insert;

FIG. 6 is a top view of a central control module or console.

FIG. 7 is a perspective view of a multiport valve;

FIG. 8 is an exploded view of the multiport valve;

FIG. 9 is a side elevation view of an actuator assembly for the multiport valve;

FIG. 10 is a section view of the open valve;

FIG. 11 is a section view of the closed valve; and

FIGS. 12 through 17 together comprise a flow chart showing operation of the marine engine drainage and coolant system.

DETAILED DESCRIPTION OF THE INVENTION

Figure 1:
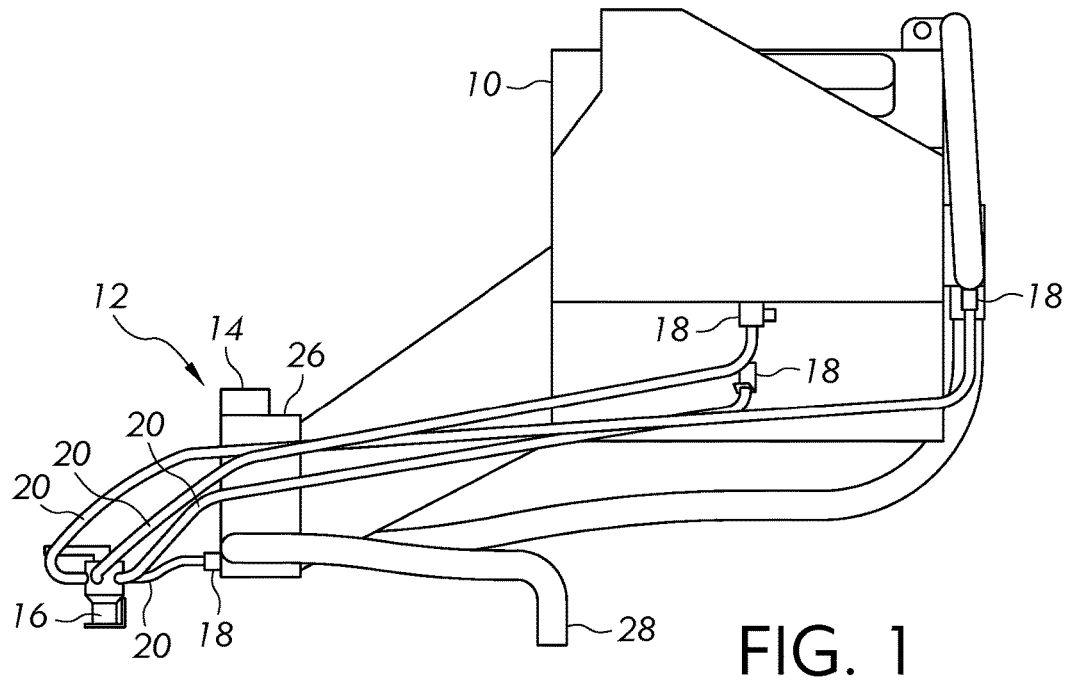
FIGS. 1 through 17 show various aspects for a marine engine drainage and coolant monitoring system made according to the present invention, as set forth below.

FIG. 1 is a schematic view of a marine engine 10 and a drainage system 12 for engine coolant according to the present invention. The drainage system 12 has a control console 14 which includes an integral controller, drainage device 16, preferably provided by a multiport drain valve, drain fittings 18, and drain tubes 20. The integral controller includes a microprocessor and memory, both transient and storage. A V-type transmission case 26 is shown forward of the marine engine 10. An intake 28 is provided for the pulling water through a bulkhead in the boat and into the marine engine 10.

The engine setup shown in FIG. 1 is an inboard V-drive setup typically used in wakeboard specific boats. In this configuration, the engine 10 is located at the back of the boat. The transmission 26, or V-drive, is attached to the front of the engine and reverts power down and back through the bottom of the boat into the propeller (not shown) creating a "V" shape. This invention is not limited to this particular engine setup and will work with any inboard engine that must be drained from drainage plugs and disconnection of coolant hoses.

The drain tubes 20 are preferably as large as practically possible, while still able to attach to the drainage device 16 to allow for quick, unobstructed drainage and venting of the coolant from the engine 10. Each fitting 18 is mechanically secured to each part of the engine that must be drained, which may include but are not limited to both engine block plugs, both exhaust manifold plugs, the transmission and subsequent hose leading up to the impeller pump housing, and the hose connecting the thermostat to the circulator pump. The drainage device 16 is preferably located at a point in the hull lower than any part of the engine and cooling system. The drain tubes 20 should maintain a downward slope from the drain fittings 18 to the multiport drainage device 16 to ensure that no water is prevented from draining. The drain tubes 20 must be heat resistant since they will experience engine operating temperatures up to 200 degrees Fahrenheit. The drainage device must keep the fluid from each drainage hose separate when it is in the closed configuration. Therefore, it would be best for this device to be either a multiport plug or packer assembly or a multiport valve that opens up all fluid hoses simultaneously when actuated. The drainage device could even be multiple electric solenoid valves that actuate simultaneously with one electrical switch. In this example, the drainage device is placed in front of the V-drive transmission since there is typically an access port under the rear seat which will provide quick and easy access to this location.

Figure 2:
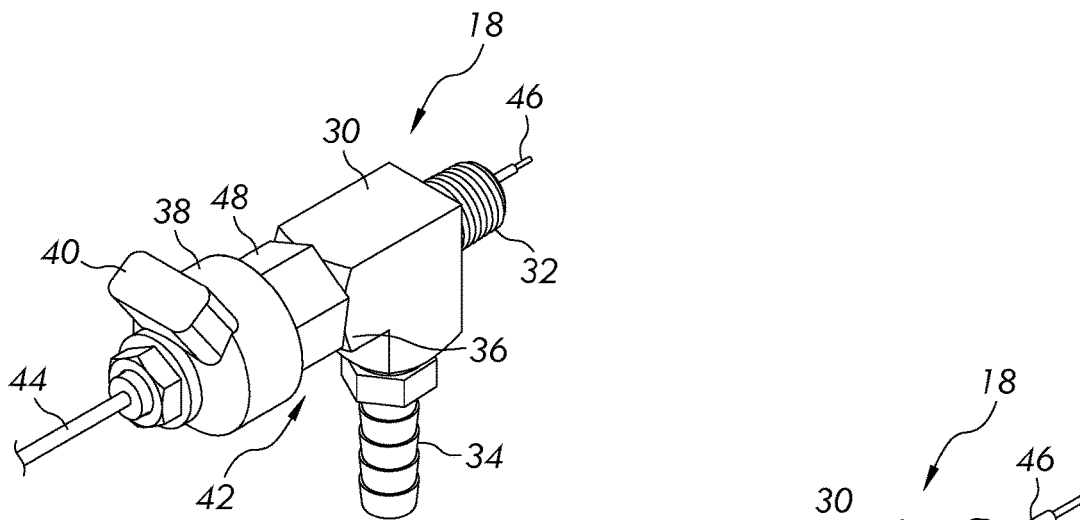
Figure 3:
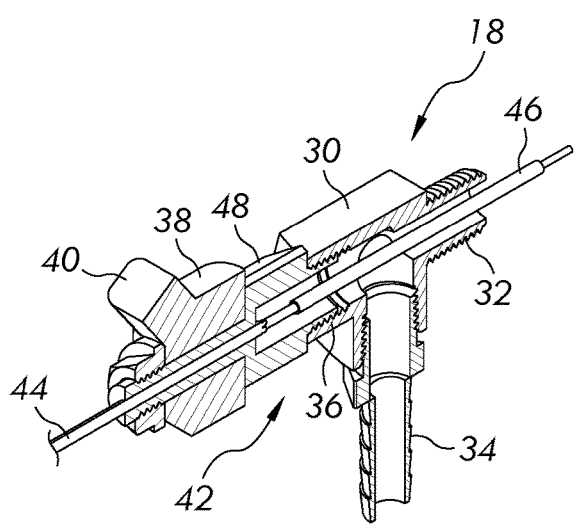

FIG. 2 is a perspective view and FIG. 3 is a longitudinal section view of one of the drain fittings 18. The drain fittings 18 preferably includes a pipe fitting 30, shown a T-type fitting having a threaded connection 32 for fitting an engine block port, a tubing connection 34 for fitting the drain tubes 20, and a threaded female connection 36 for receiving a fluid sensor 42. A knock sensor 38 is preferably mounted on the fluid sensor 42 and has an electrical connector 40 for connecting the knock sensor 38 to a motor control console for the boat on which the marine engine 10 is mounted. A fluid sensor 42 has electrical leads 44 for connecting the fluid sensor 42 to the console 14. Electrodes 46 are provided by corrosion resistant rods which extend outwards from the end of the pipe fitting 30 for extending within a drain port in the engine block for sensing when water is present. A sensor housing 48 is preferably provided by a pipe fitting which is configured for securing within the female threaded connection 36 of the pipe fitting 30. The electrical leads 44 are secured to the electrodes 46 in the sensor housing.

The fitting displayed in FIGS. 2 and 3 is one of the engine block fittings. The higher performance engines require knock sensors 38 to monitor engine performance. Typically these knock sensors 38 are mounted to an engine block drain plug. In order for this system to be installed as an aftermarket product, this assembly must provide a location to mount the knock sensor and the fitting must be designed such that it has a secure and stable connection with the engine to transfer vibrations successfully to the knock sensor. This assembly has a fluid sensor 42 which has specially cut pipe threads which allow it to mount flush to a standard pip thread fitting allowing all vibrations to transfer into the body of the probe. The knock sensor 38 mounts to the back side of the fluid sensor housing 48. The different drain fittings 18 will have slightly different construction to accommodate the specific location in which it is used.

Figure 4:
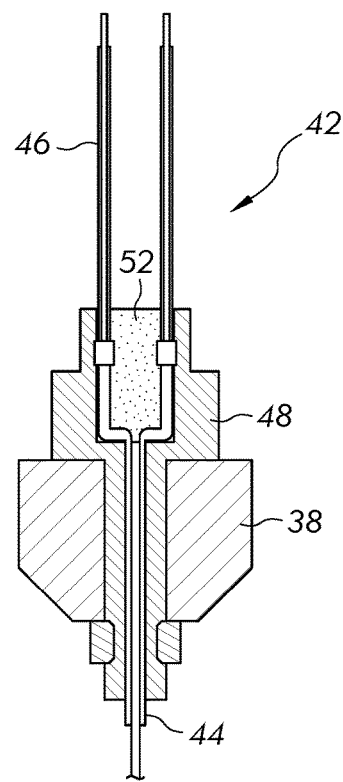
Figure 5:
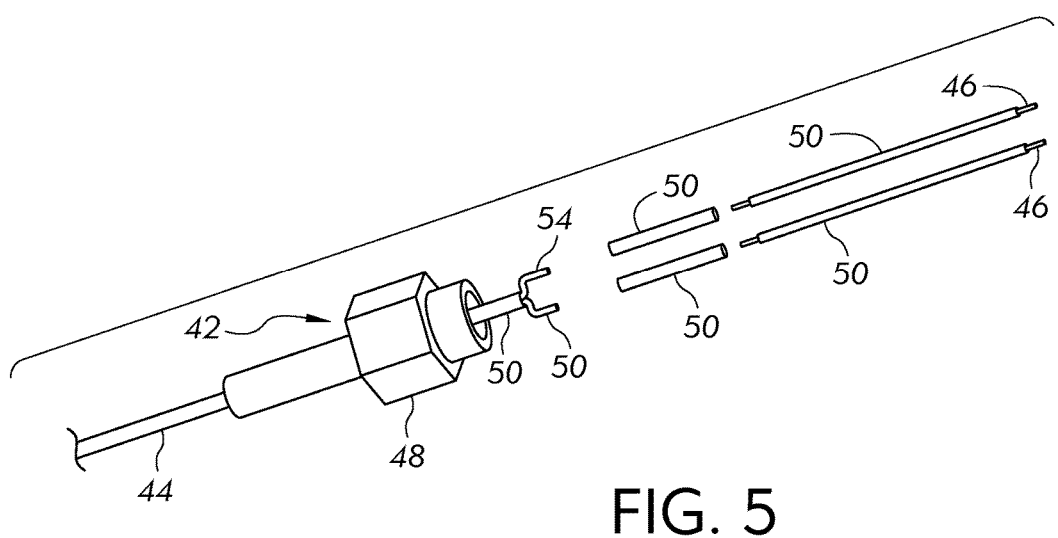

FIG. 4 is a longitudinal section view and FIG. 5 is an exploded, perspective view of one of the fluid sensors 42. The electrical leads 44 are shown extending into the housing 48 for connecting to the electrodes 46. Terminal ends 54 of the electrical leads 44 are connected to separate ones of the electrodes 46. The electrodes 46 are preferably provided by corrosion resistant metal rods, which are conductive. Two spaced apart electrodes 46 are used in each of the fluid sensors 42. Two insulators 50 are provided for fitting around the electrodes 46 and corresponding ones of the terminal ends 54 of the electrical leads 44. The insulating material must be strong, corrosion resistant and heat resistant since it will be handled by the end user during installation and maintenance, and it will also experience engine operating temperatures. Potting material 52 such as an epoxy is provided for securing the terminal ends 54 of the electrical leads 44 and the inward ends of the electrodes 46 in fixed relation to one another and the housing 48, and insulating the leads 44 and the electrodes 46 from the housing 48. The fluid sensor 42 is preferably a conductivity sensor, and will conduct electric current across the electrodes 46 when the electrodes 46 are submerged in water. The fluid sensors 42 should be designed such that the electrodes 46 do not make contact with the metal engine block or trap water between the engine block and the electrodes 46 in order to prevent a short circuit.

Figure 6:
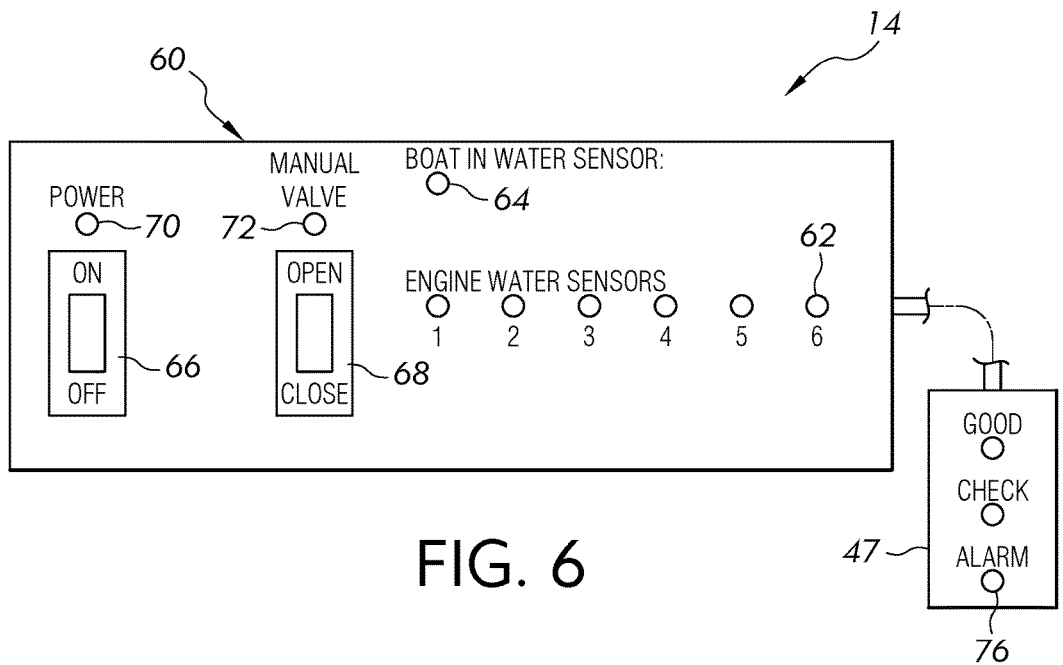

FIG. 6 is a top view of a control console 14 for controlling the operation of the drainage device 16 and monitoring the multiple fluid sensors 42 in each of the drain fittings 18. The control console 14 does not monitor the knock sensor 38, but rather knock sensor 38 is monitored by the manufacture's installed control processor for operating the marine engine 10. The control console 14 has a console housing 60 with indicator lights 62 and 64 that provided indications of when the presence of water detected in respective ones of the various drain fittings 18, and when water sensors detect that the boat on which the marine engine 10 is installed is disposes in water. A power switch 66 and a manual valve actuation switch 68 are provided. The manual valve actuation switch can be presses to manually operate the multiport drainage device 16. An indicator light 70 is provided to indicate when the power switch 66 has been actuated and indicator light 72 is provided for indicating when the manual valve switch 68 is actuated. An internal alarm 74 and an alarm light 76 are also provided at the dashboard of the boat.

Figure 7:
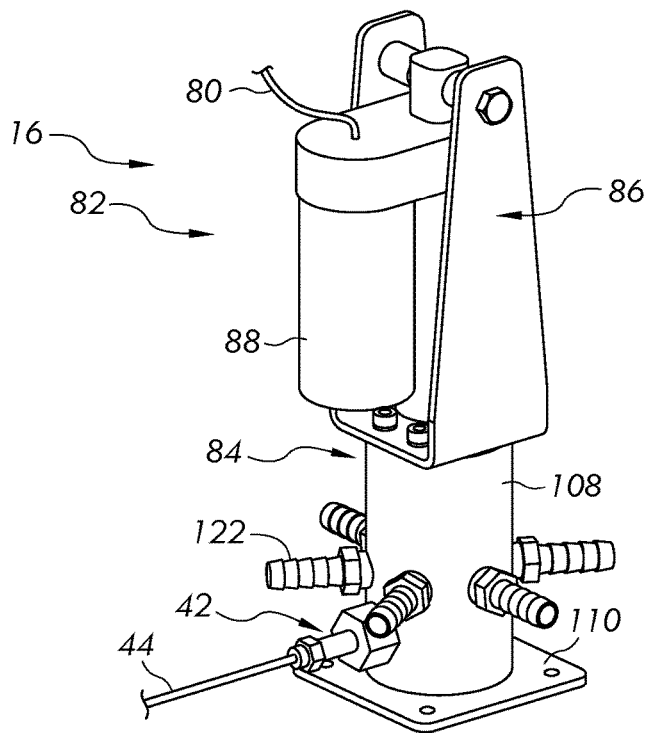
Figure 8:
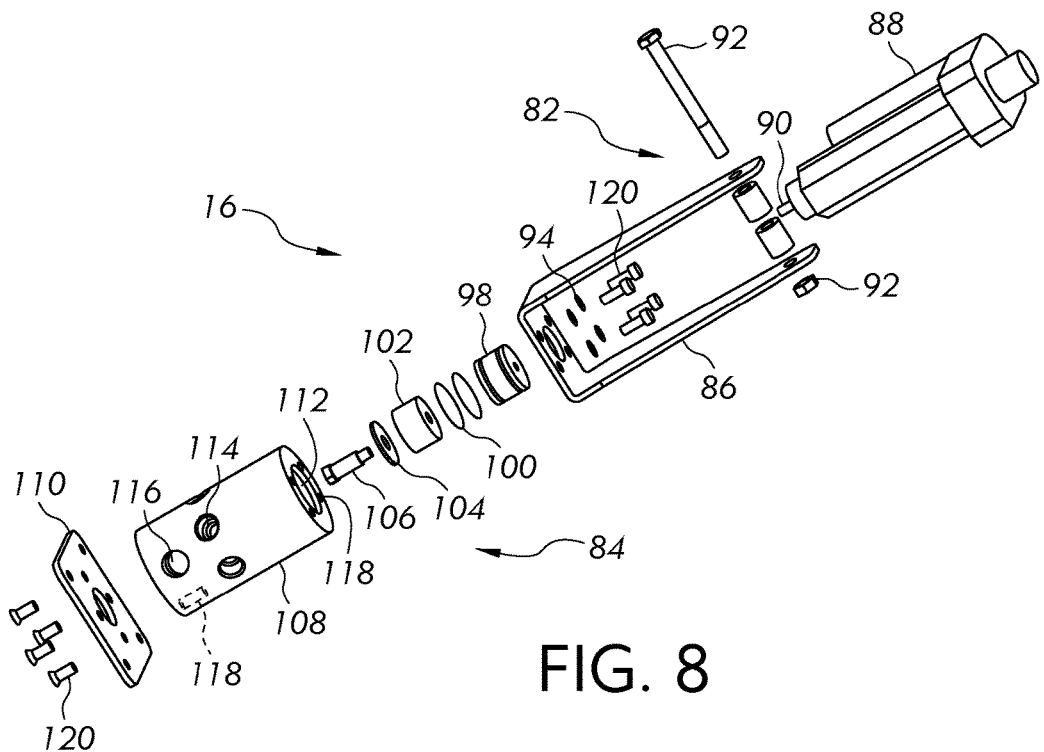
Figure 9:
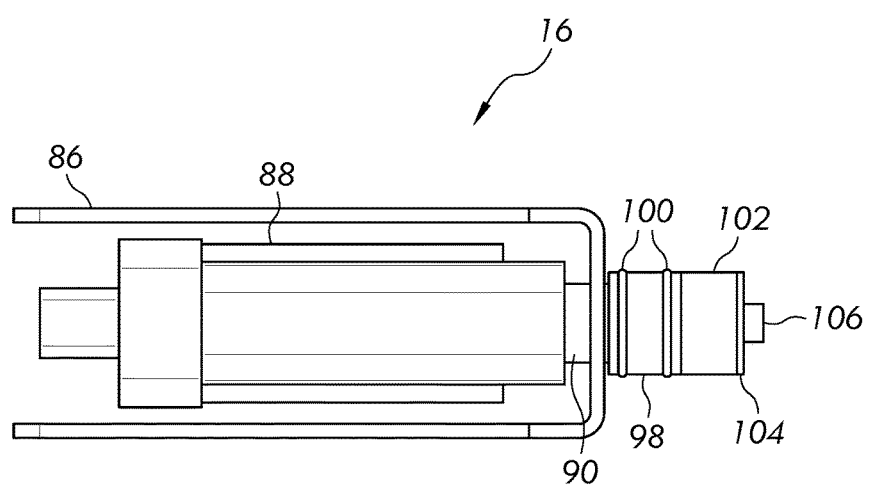

Preferably, the drainage device 16 would be an electrically actuated multiport drain valve 78. FIG. 7 is a perspective view, FIG. 8 an exploded view, and FIG. 9 a side elevation view of an upper portion of a multiport drain valve 78. Multiport drain valve 78 preferably has an actuator section 82 and a valve section 84. The actuator section 82 has an actuator mounting bracket 86 which is mounted a linear actuator 88. An actuator rod 90 extends outward from the linear actuator 88 for moving from an extended to retracted position for placing the multiport drain valve 78 in either an open or a closed position. A bolt and nut assembly is provided for securing the actuator 88 to the mounting bracket 86. A seal piston 98 is mounted to the lowermost end of the actuator rod 90. The seal piston 98 has seal glands in which seal rings 100 are disposed. The seal rings are preferably O'rings. A seal element 102 is provided by an elastomeric seal member which provides a plug seal for fitting within the valve section 84 of the multiport drain valve 78. Washer 104 and fastener 106, preferably a shoulder screw, are provided for securing the seal element 102 beneath the piston 98.

The valve section 84 has a valve body 108 and a base 110 which is secured to the lower end of the valve body 108. Central flow passage 112 extends longitudinally through the central portion of the valve body 108 and multiple flow ports 114. Preferably, eight of the flow ports 114 are provided and one fluid sensor port 116. The flow ports 114 and 116 are threaded and extend transversely through the valve body 108, perpendicular to the central longitudinal axis of the valve body 108 and the central flow passage 112. Tubing nipples 122 are threadingly secured in the flow ports 114. The tubing nipples 122 having outward barbed ends for fitting within and securing ends of the drain tubes 20 thereto. One of the fluid sensors 42 are threadingly secured in the fluid sensor port 116. Threaded fastener holes 118 are provided in upper and lower ends of the valve body 108 for receiving fasteners 120 and washers 94 for securing the valve body 108 to the actuator mounting bracket 86 and the base 110. The base 110 is preferably a flat plate with a hole for registering with the central flow passage 112. The valve body 108 has a chamber 124 which is part of the central flow passage 112. The central flow passage 112 has a discharge port 126. Discharge port 126 and the chamber 124 of the central flow passage 112 together have a profile 128 which defines a shoulder 130 which provides a stop for the seal element 102 and the piston 98.

Figure 11:
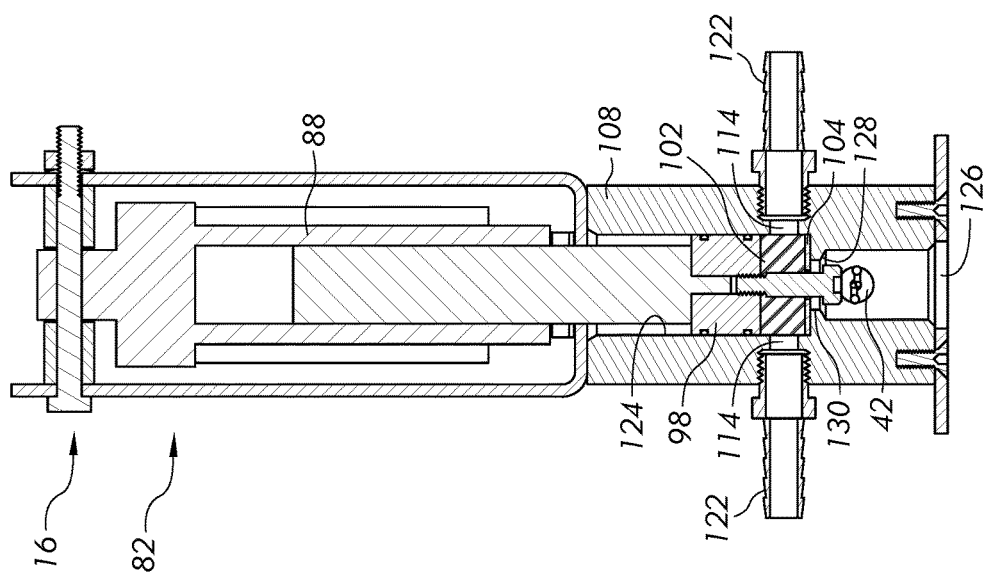
Figure 10:
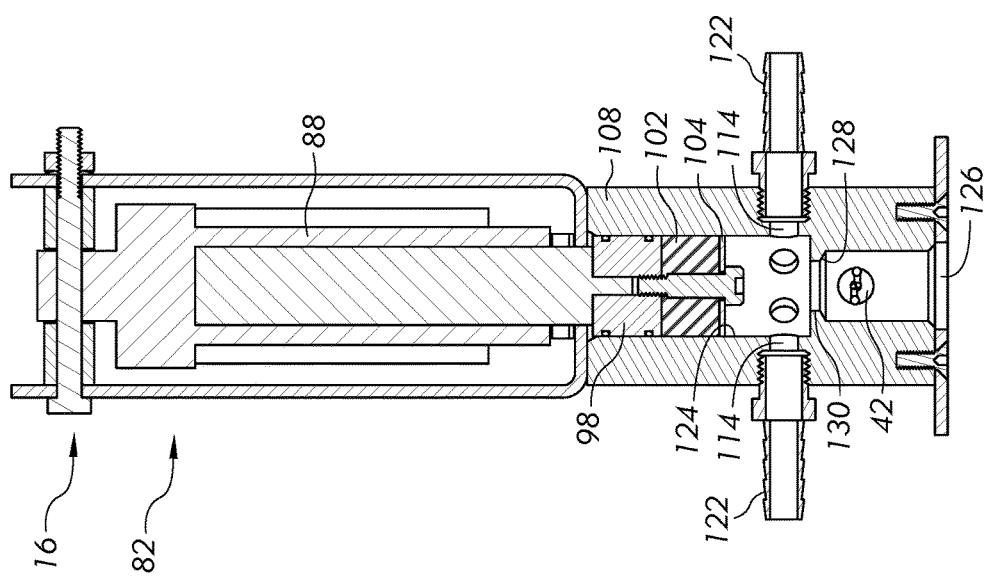

FIG. 10 and FIG. 11 are longitudinal section views of the multiport drain valve 78, with FIG. 10 showing the valve 78 in an open position, with the seal element 102 disposed aside of the flow ports 114, and FIG. 11 showing the valve 78 in a closed position, with the seal element disposed across and sealing the flow ports 114. In the open position, the actuator 88 has pulled the piston 98 and the seal element 102 upwards within the chamber 124, disposed aside of the multiple flow ports 114 so that fluid may flow through the drain ports in the block of the marine engine 10, through the drain tubes 20, through the tubing nipples 122 and the flow ports 114, and into the central flow passage 112 of the valve body 108. Fluid will then flow through the discharge port 126 and either through a bulk head fitting for flowing from the boat or into the bilge of the boat. In FIG. 11, the actuator 88 moves the piston 98 and the seal element 102 to a closed position, with the seal element 102 sealingly engaging against the sidewalls of the chamber 124 and sealing the flow ports 114 from fluid flowing there through. The seals 100, preferably provided by O'rings, on the piston 98 preferably seal against the walls of the central flow passage 112 to prevent fluid from flowing out of the top of the drain valve 16. The seal element 102 and the washer 94 is preferably sized to provide clearance with the walls of the chamber 124 so that the seal element will not be torn by fitting into the flow ports 114 during upward or downward movement. Once in the closed position, the actuator 88 will press against the piston 98, pushing the seal element and the washer 104 against the shoulder 130. The shoulder 130 is annular-shaped and provides a stop for the washer 104 to press against. The actuator 88 will further press against the piston 98 to apply pressure to the seal element 102 and squeeze the seal element 102 between the piston 98 and the washer 104, causing the seal element 102 to expand and seal the flow ports 114. When disposed in the open position shown in FIG. 10, the seal element 102 is no longer pressed between the piston 98 and the washer 104, and is elastic such that the seal element 102 will return to its original form and outside diameter, with clearance from the walls of the chamber 124. Fluid sensor 42 mounted in the lower end of the central flow passage 112, adjacent the discharge port 126, will sense whether fluid is flowing through the multiport drain valve 78.

Figure 12:
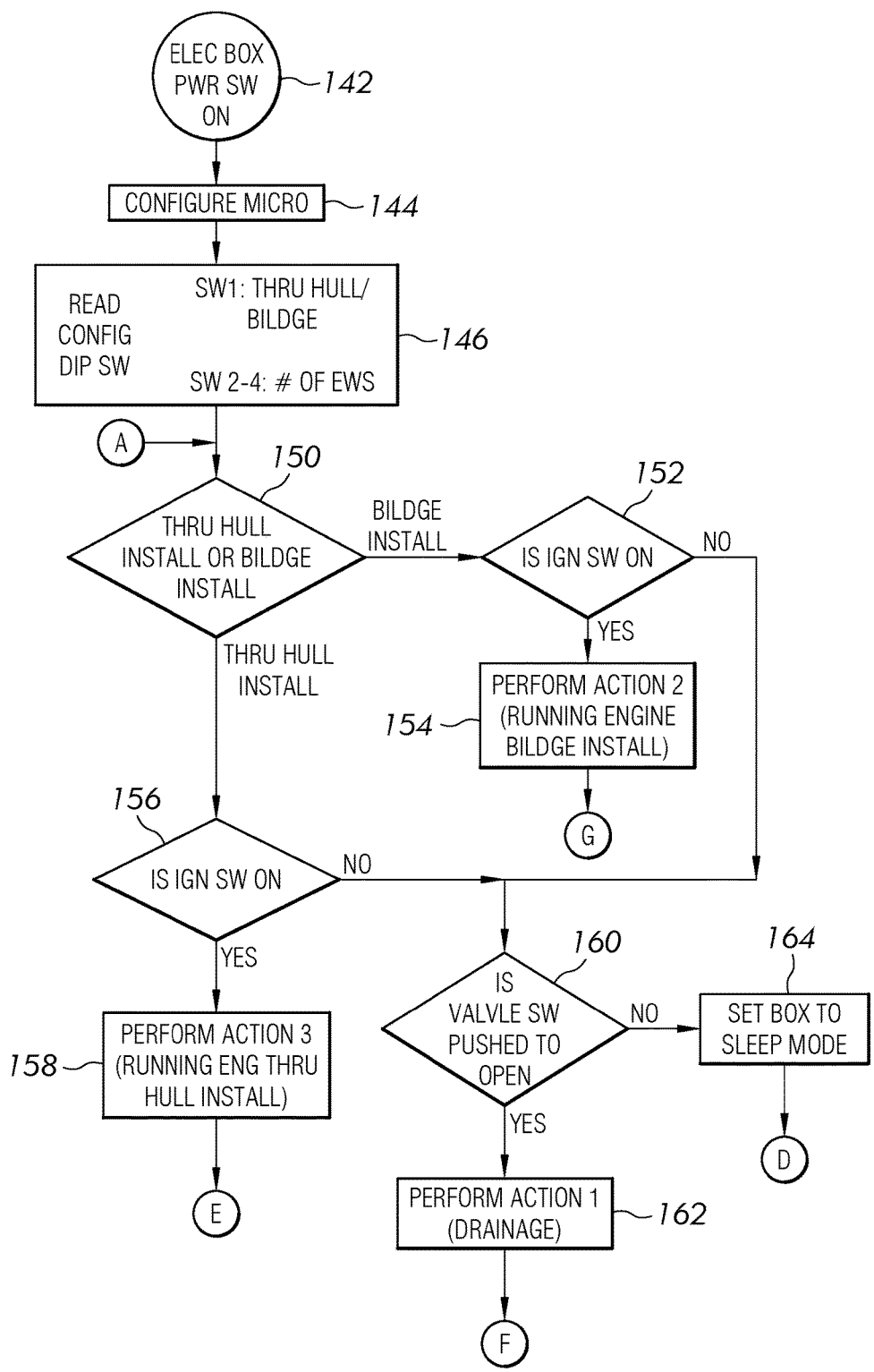
Figure 13:
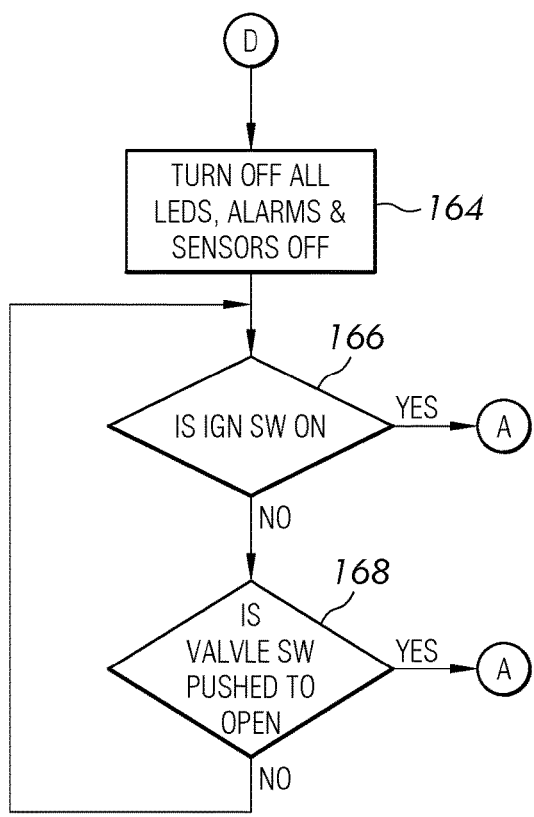

FIGS. 12 through 17 together comprise a flow chart showing operation of the marine engine drainage and cooling system 12. As shown in FIG. 12, the power switch 66 is first turned on to start the system in step 142. In step 144, the microprocessor is configured according to software stored in memory. In step 146, the microprocessor reads the dip switch configuration for determination of whether a through hull or bilge drain installation is present, and the total number of motor block ports being drained. The process then proceeds to decision block 150 and a determination is made whether a through hull installation is present or a bilge installation. If a bilge installation is present, the process proceeds to block 152 and a determination is made of whether the engine switch is turned on. If then turned on, the process proceeds to step 154 and a determination is made if the engine is running and then the process will proceed to node G which connects to node G in FIG. 16. FIG. 13 the system goes into sleep mode from node D and block 164 the processor will turn off all LEDs, alarms and sensors. The process then proceeds to step 166 and a determination is made of whether the engine switch is on. If the engine switch is on, the process proceeds to node A which returns to node A in FIG. 12. If the engine switch is not on, the process proceeds to step 168 and a determination is made whether the valve switch is pushed open. If yes for the manual valve switch to be pushed open, the process proceeds to node A which connects to FIG. 12 at node A. If the valve switch is not pushed on, the process returns back and again goes to decision block 166. If in block 150 a determination is made that a through hull installation is present, the process proceeds to decision block 156 and a determination is made whether the ignition switch is on. If the ignition switch is on, the process proceeds to block 158 and it goes to perform an action, the process proceeds to node E in FIG. 17. Instead in block 156 a determination is made that the engine switch is not on, the process proceeds through decision block 160. Similarly, if in decision block 152, a determination is made that the engine switch is not on, the process also then proceeds to the decision block 160. At decision block 160, a determination is made of whether the manual valve switch 68 has been placed in the open position. If not, the process proceeds to step 164 at the sleep mode and then wake up when the ignition switch is on in step 166 and then proceeds to node A in FIG. 12. If the switch has been pushed to manual drain, the process proceeds to step 162 to perform the actions set forth for drainage which then proceeds to node F in FIG. 14.

Figure 14:
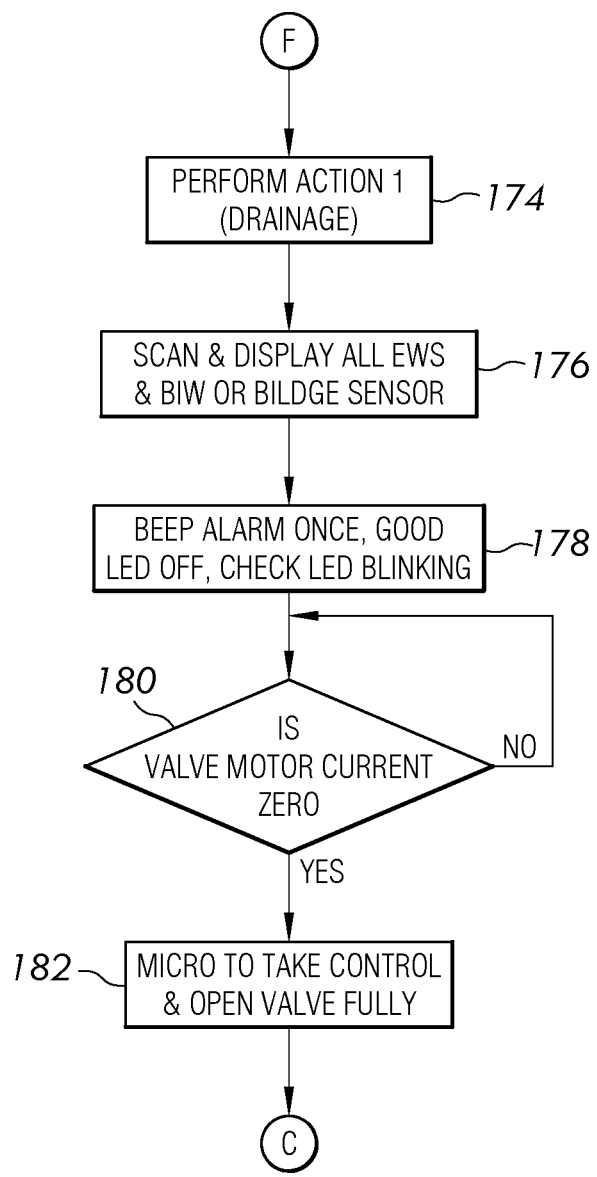
Figure 15:
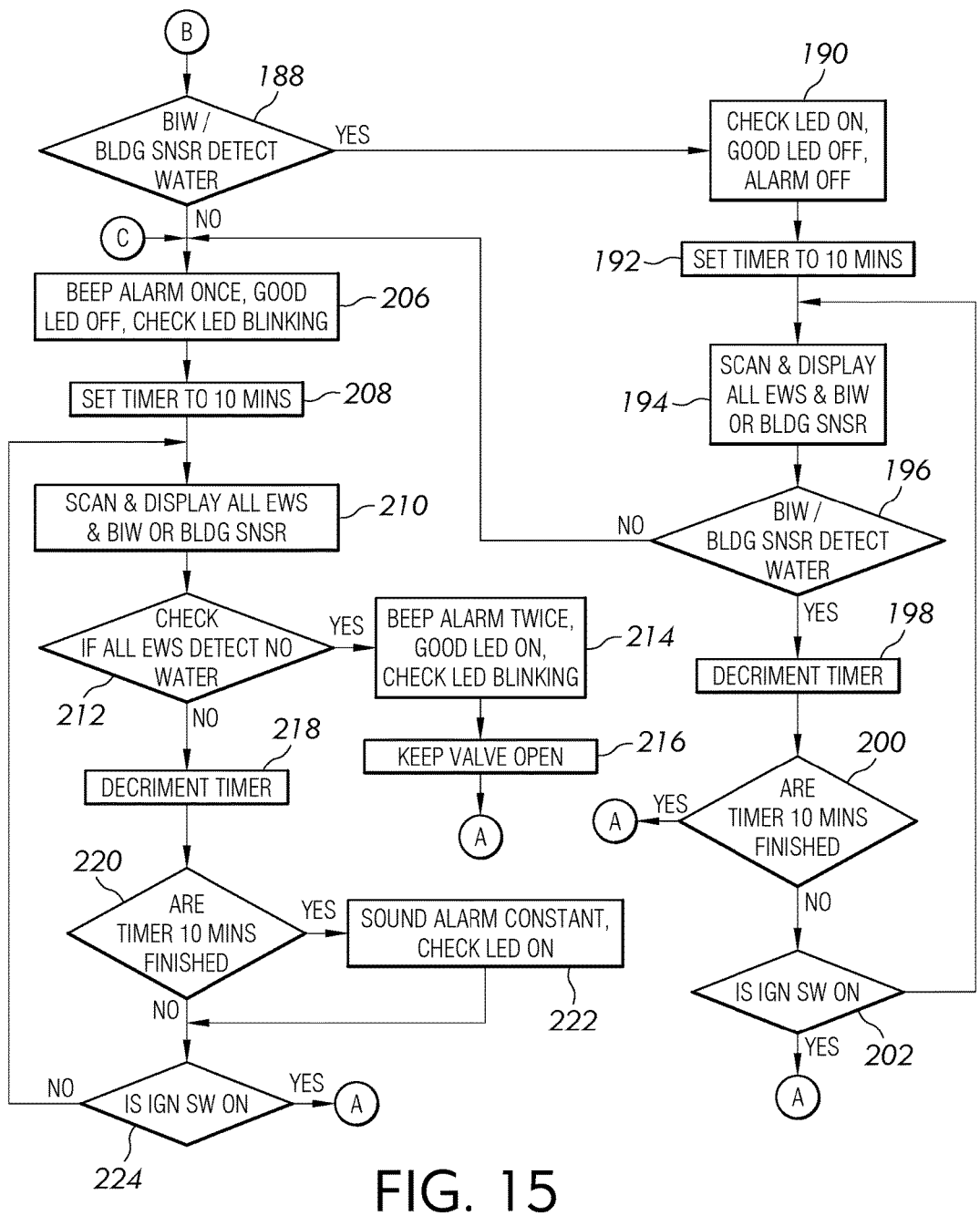

Referring to FIG. 14, beginning at node F, block 174 drainage of the system of the engine block is initiated. In step 176, a display in block sensors are scanned. In step 178, the alarm has beeped once, the good LEDs off and the check LED is blinking in block 178. Then the process proceeds to the decision block 180 and a determination is made as to whether the valve current is zero. If not, the process proceeds back to block 180 and again the determination is made as to whether valve current is zero. If the valve load current is zero, the process proceeds to step 182 and the controller opens the drain valve 16 fully. The process then proceeds to node C shown in FIG. 15. FIG. 15 shows a process having two initiation points, one is node B which refers to node B in FIG. 17, and the second is node C which refers to node C in FIG. 14.

Figure 17:
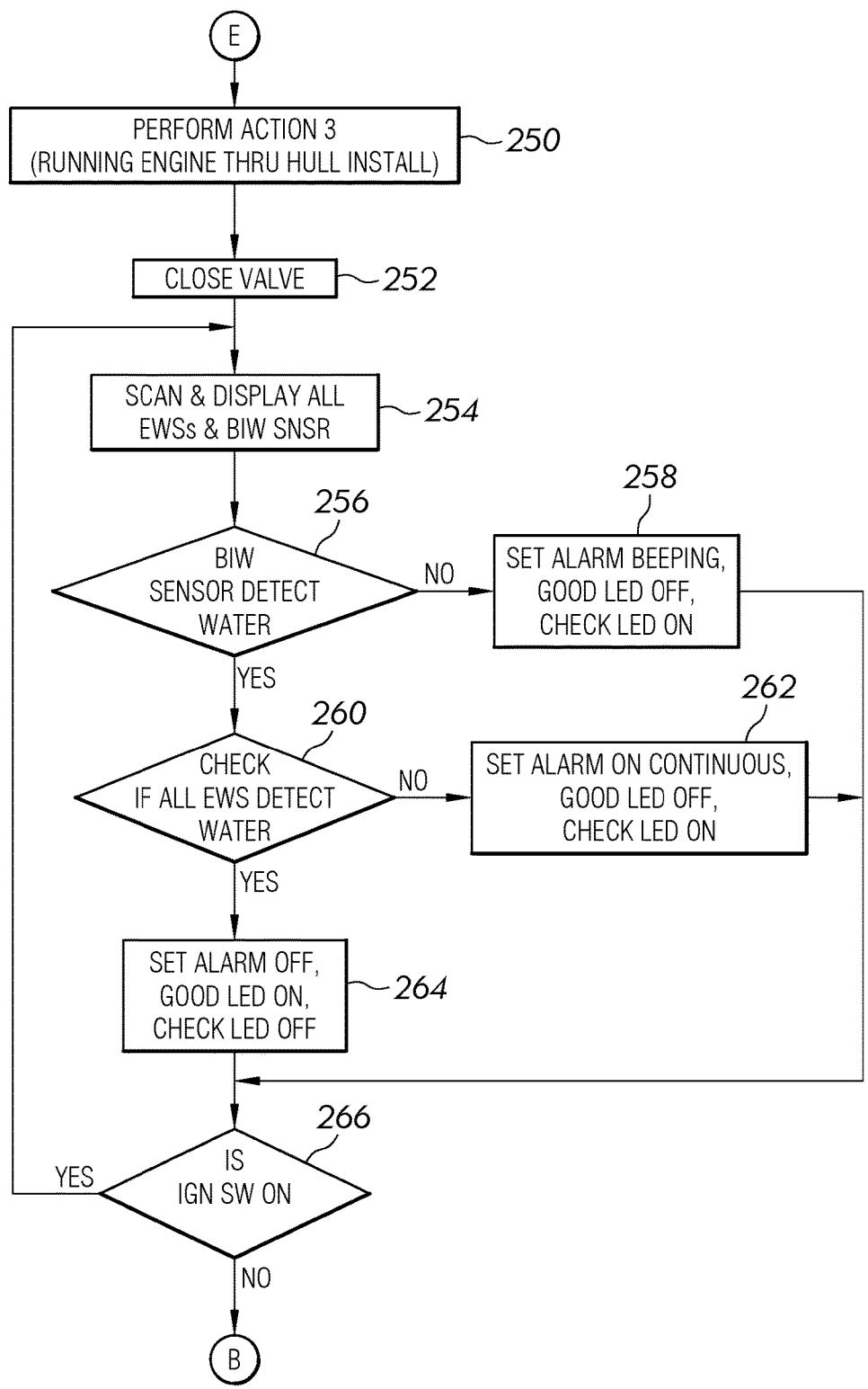

As shown in FIG. 17, once a determination is made in decision block 266 that the ignition switch is not on, the process proceeds to decision block 188 and a fluid sensor 42 determines whether moisture is detected. If so, the process proceeds to step 190 and the check LED is turned to on, the good LED is turned to off, and the alarm is turned to off. The process then proceeds to step 192 and the timer is set to ten minutes. The process then proceeds to step 194 and all the flow sensors are checked to make a determination of whether fluid is present. Then at decision block 196 a determination is made of whether water is detected by one of the moisture sensors. If not, the process proceeds over to decision block 206 which is discussed below. If moisture is present, the process proceeds to step 198 and the timer is decremented by a selected increment. Then the process proceeds to decision block 200 where the ten minute timer has finished timing and clocked out. If not, the process proceeds to decision block 202 and a determination is made in that step is whether the ignition switch is on. If not, the process proceeds back to step 194 discussed above. Yes, the proceeds to node A, which is shown in FIG. 12. A determination is made in decision block 200, the timer is finished, the process proceeds to node A in FIG. 12.

If in step 188, a determination is made that water is not detected by the fluid sensors, the process proceeds to step 206. Similarly, the process proceeding from mode C in FIG. 14 will also proceed to block 206. In step 206, the alarm has beeped once, the good LED is turned off, and the check LED begins blinking. The process then proceeds to step 208 and the timer is set to ten minute intervals. The process then proceeds to step 210 and the moisture sensors are checked to determine whether moisture is present. The process then proceeds to step 212 and makes a determination whether water is detected. If water is detected, the process proceeds to step 214, the alarm has beeped once, the good LED turns on, and the check LED is turned off. In step 216, the multiport drain valve 78 is kept in an open position, the process proceeds to node A and returns to node A in FIG. 12. If in decision block 212, a determination is made that there is water present, the process proceeds to step 18 and the timer is decremented. Then in decision block 220, a determination is made of whether the timer interval, preferably ten minutes, has completed. If so, the alarm is sounded and check LED is turned on in step 222. If the check LED is turned on, then the process proceeds to decision block 224 and a determination is made as whether the ignition switch is still on. If the ignition switch is still on, the process returns to node A of FIG. 12. If in step 220, the timer is not finished, the process proceeds to step 224 and a determination is made as whether the ignition switch is on. If the ignition switch is not on, the process proceeds back to step 210 to scan the moisture sensors.

Figure 16:
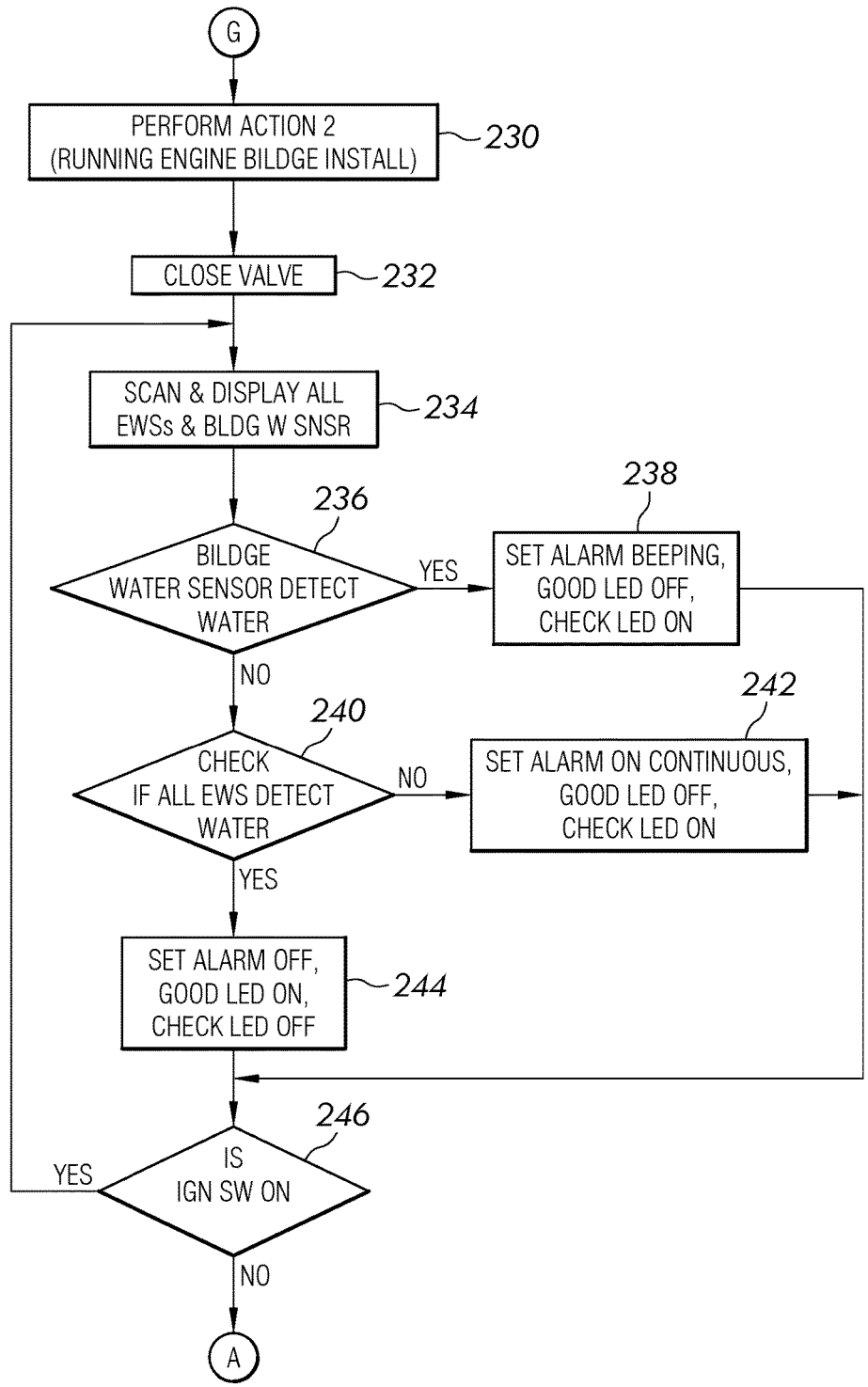

FIG. 16 shows the processing beginning from node G to perform action to and running an engine bilge installation ending in step 230. In step 232, the valve is closed. In step 234, the fluid sensors are scanned. Then, the process proceeds to step 236 and a determination is made if one of the bilge water sensors detects water. If yes, the alarm is set to beep, the good LED is turned off, and the check LED is turned on in step 238. The process proceeds to decision block 246. If in decision block 236, water is not detected in the bilge, the process proceeds to step 240 and a determination is made as to whether any of the moisture sensors detect water. If not, the continuous alarm is sounded, the good LED is turned to off, and the check LED is turned to on and this proceeds to decision block 246. If all moisture sensors detect water, the process proceeds to step 244 and the alarm is set to off, the good LED is turned to on, and the check LED is turned to off and the process proceeds to step 246. End of step 246 is a decision block which determines if the ignition switch is set to on. If yes, the process proceeds back to step 234 with a scan and display of all fluid sensors. If off, the process proceeds to node A in FIG. 12.

FIG. 17 shows the process moving from the step 158 of FIG. 12 to the step 250 of FIG. 17. In step 252, a multiport valve 78 is closed. Then the process proceeds to step 254 and the sensors are scanned and a determination is made as to which LED lights to display. In step 256 a determination is made as to whether the sensors detect water. If the sensors do not detect water, the process proceeds to step 258 and the alarm is set to beeping, the good LED is turned off, and the check LED is turned on. Then the process proceeds to decision block 266 for determination whether the ignition switch is on. If water is detected in step 256, the process proceeds to step 260 and a determination is made as to whether all fluid sensors also detect water. The alarm is set to continuous in step 262, the good LED is turned off, and the check LED is turned on. The process proceeds to step 266 and a determination is made as to whether the ignition switch is on for the engine 10. If in step 260 the fluid sensors detect water, the process proceeds to step 264 and the alarm is set to off, the good LED is turned on, and the check LED is turned off. The process proceeds to step 266 and a determination is made whether the engine switch is on. If, in step 266, a determination is made that the ignition is on the moisture sensors are scanned and the display LEDs are set accordingly correspond to each sensor. If, instead, ignition switch determination is made in step 266, that the ignition switch is set to off, the process proceeds to node B of FIG. 15. The above process may be performed by an onboard computer having a microprocessor as machine readable instructions.

For the in bilge installation, to drain the engine 10 the operator must press the manual valve switch 68 and the console will start the drainage procedure for opening the drain valve 78. When the manual drain switch 68 is in the on position, all lights 62 should light up indicating fluid in each part of the engine and the proper functioning of the drain system 12. Once all lights are verified to be lit, the control console 14 can actuate the drainage valve 78 to release coolant from all drain ports of to the engine 10. Once all the coolant is drained from the engine, all of the indicator lights 62 should turn off. If a one of the indicator lights 62 does not turn off, this indicates that there is a blockage or other malfunction in that part of the system and proper steps must be taken to ensure that part of the engine 10 drains properly. Once all of the water indicator lights 62 have been verified to be off, the control console 14 can go to sleep mode and wait for the manual drainage switch 68 to be pushed on again. It is the operators option to return the drainage device 16 to the closed position at this time because condensation can build inside the engine 10 and collect, usually not enough to crack the engine 10, but enough to cause corrosion. If the drainage device 16 is closed then condensation will be trapped in the engine 10. The control console 14 will return the drainage device 16 to the closed position when the boat is turned on again. For the boat operator to verify there is coolant in the system during boat operation, he can view the control console 14 and verify that all of the fluid indicator lights 62 are on. If one or more of the indicator lights 62 does not light up, the engine coolant system is not functioning properly and an alarm will sound. For this instance, the engine water will drain into the bilge area (lower port of the hull). This water is typically removed from the bottom of the boat during normal care taking which requires vacuuming the bilge to remove water built up from wet persons and equipment entering the boat and water coming over the side of the boat. While it sounds bad to empty the engine water into the hull of the boat this water only accounts for a small fraction of the water that collects in the bilge during normal use.

In the through hull installation, the drainage device 16 is attached to a through hull fitting which allows the engine water to be drained out of the boat completely. When the boat operator turns on the engine 10, the control console 14 will apply an electrical signal to the fluid sensors 42 in the drain fittings 18. If the control console 14 detects continuity between the two electrodes 46 of a fluid sensor 42, the control console will thus determine that fluid is connecting between the two electrodes 46 in the respective drain port of the engine 10. The control console 14 may also check the fluid sensors 42 periodically to monitor whether the cooling system is functioning properly. It would also be beneficial to have a flow sensor in line with the raw water intake hose to make sure that water is flowing through the cooling system and not just sitting in the engine 10 heating up. If there is no water in one of the parts of the engine 10 monitored by the fluid sensors 42 or if water is not flowing through the cooling system, the control console can alert the operator that there is a problem. Many of the new boats have display screens on the drivers dash board which display many things including engine diagnostics. If this invention were coupled with a display such as this, the control console could then display the specific problem to the boat operator. When the boat operator turns off the engine 10, the control console 14 will electronically actuate the drain device 16 to release all of the water from the cooling system of the engine 10. The control console 14 may also monitor the fluid sensors 42 until all the fluid sensors 42 stop returning a signal at which point the control console 14 can acknowledge to the boat operator that drainage was successful and shutdown. If the control console 14 continues to receive a signal from a fluid sensor 42 for a longer amount of time than it should take to drain, then the control console 14 may set off an audible alarm 74 and a visual alarm 76 which alerts the boat operator that there is a malfunction and exactly where the malfunction is located. For this instance, the discharge port 126 of the drain valve 16 should be securely attached to a through hull port, either a drain secured to a hole cut in the bottom of the boat or tied into the intake 28 of the cooling system. Otherwise, if the boat engine 10 is turned off while the boat is in the water and the discharge port 126 of the drain valve 16 is set up to release the water into the hull, water will be forced from the body of water, through the cooling system, and into the boat, sinking the boat. However, if the drain valve 16 is securely set up to release the water through the hull and out of the boat, the engine water will not drain while the boat is in the water, but, since the system will be closed, the boat will not take on water and will not sink. For drainage, the boat must be out of the water on either a boat lift or a trailer. Additionally, for this instance, the fluid sensor 42 do not necessarily have to be integrated with the drain fitting 18 since the engine manufacturer has the option of drilling new holes in the engine 10 next to an engine block drain port where the drain fitting 18 is located.

Both instances of this invention allow the engine of the boat to be drained quickly, conveniently, and verifiably, without entering the engine compartment, without unscrewing multiple engine plugs and without unfastening any coolant hoses. Should any of the drain tubes or fittings become clogged with moss, grass, dirt, rust or scale, the console or engine computer will indicate this to the boat operator. Other drainage systems that provide quick and easy drainage, but do not provide any method for verifying drainage of every part of the cooling system are setting the boat owner up for costly repairs when their drainage systems visually appear to have worked and then water trapped by debris cracks the engine block. These other systems also cannot be installed by boat manufacturers because they cannot be trusted and they provide a large liability to the manufacturer.

Although the preferred embodiment has been described in detail, it should be understood that various changes, substitutions and alterations can be made therein without departing from the spirit and scope of the invention as defined by the appended claims.

What is claimed is:

1. A marine engine drainage system for removing engine coolant, comprising:
   a plurality of drain fittings secured to drain ports of said marine engine;
   said plurality of drain fittings, each having a first and a second connection, wherein said first connection is configured for securing to a first drain port of said marine engine, said second connection is configured for receiving a fluid sensor;
   said fluid sensors, extending outward from an end of respective ones of said plurality of drain fittings and into an engine block of said marine engine for sensing when water is present in said drain ports of said engine block;
   a drainage device having a plurality of flow ports connected to respective ones of said drain fittings with drain tubes connecting there-between;
   a control console having a microprocessor and memory for processing and storing machine readable instructions, said control console electrically connected to respective ones of said plurality of drain fittings for monitoring whether fluid is present in respective ones of said drain ports; and
   wherein said fluid sensors are monitored for determining whether water is present at said drain ports, and said drainage device is operated for draining the water from said engine block of said marine engine.

2. The marine engine drainage system of claim 1 wherein said fittings each contain a sensor configured for determining the presence of water in each respective part of the engine.

3. The marine engine drainage system of claim 2, wherein said sensors are configured for sensing the presence of water by means of electrodes configured for conducting electricity through the water disposed there-between.

4. The marine engine drainage system of claim 2, wherein said control console indicates to a boat operator whether or not there is water in the different parts of the engine cooling system and the boat operator can use this information to:
   determine if the engine cooling system is functioning properly during normal operation of the boat engine;
   determine if all parts of the drainage system are functioning properly before the drainage device is actuated;
   determine if all of the water has drained from the engine cooling system after the drainage device is actuated; and
   determine which parts of the engine still contain water should the drainage system malfunction.

5. The marine engine drainage system of claim 4, wherein said control console and said fluid sensors may be turned off by means of one of a switch on the console and by turning off the engine.

6. The marine engine drainage system of claim 4, comprising an in-bilge installation of said drainage device in which said control console is controlled and monitored by the boat operator and said drainage device is actuated by the boat operator, draining the engine water only when done so by the boat operator.

7. The marine engine drainage system of claim 2,
   comprising a through hull installation of said drainage device in which said control console monitors said fluid sensors and actuates the drainage device electronically, draining the engine water every time the engine is turned off, prompting boat operator action only in the event of a malfunction, and is operable for alerting the operators as to whether:
   the engine cooling system is functioning properly during normal operation of the boat engine;
   all parts of the drainage system are functioning properly before the drainage device is actuated;
   all of the water has drained from the engine cooling system after the drainage device is actuated; and
   determine which parts of the engine still contain water should the drainage system malfunction.

8. A marine engine drainage system for removing engine coolant, comprising:
   a plurality of drain fittings secured to drain ports of said marine engine;
   said plurality of drain fittings, each having a first and a second connection, wherein said first connection is configured for securing to a first drain port of said marine engine, said second connection is configured for receiving a fluid sensor;
   said fluid sensors, extending outward from an end of respective ones of said plurality of drain fittings and into an engine block of said marine engine for sensing when water is present in said drain ports of said engine block;
   a drainage device having a plurality of flow ports connected to respective ones of said drain fittings with drain tubes connecting there-between;
   a control console electrically connected to respective ones of said plurality of drain fittings for monitoring whether fluid is present in respective ones of said drain ports; and
   wherein said fluid sensors are monitored for determining whether water is present at said drain ports, and said drainage device is operated for draining the water from said engine block of said marine engine.

9. The marine engine drainage system of claim 8 wherein said drain fittings each comprise a pipe tee with at least one end threaded for threadingly securing into said engine block.

10. The marine engine drainage system of claim 8, wherein said sensors are configured for sensing the presence of water by means of electrodes configured for conducting electricity through the water disposed there-between.

11. The marine engine drainage system of claim 10, further comprising said electrodes being disposed within said engine block, and outward of respective ones of said ends of said drain fittings.

12. The marine engine drainage system of claim 11, further comprising said electrodes being defined by respective ones of corrosion resistant rods.

13. The marine engine drainage system of claim 8, wherein control console indicates to a boat operator whether or not there is water in the different parts of the engine cooling system and the boat operator can use this information to:
   determine if the engine cooling system is functioning properly during normal operation of the boat engine;
   determine if all parts of the drainage system are functioning properly before the drainage device is actuated;
   determine if all of the water has drained from the engine cooling system after the drainage device is actuated; and
   determine which parts of the engine still contain water should the drainage system malfunction.

14. The marine engine drainage system of claim 13, wherein said control console and said fluid sensors may be turned off by means of one of a switch on the console and by turning off the engine.

15. The marine engine drainage system of claim 13, comprising an in-bilge installation of said drainage device in which said control console is controlled and monitored by the boat operator and said drainage device is actuated by the boat operator, draining the engine water only when done so by the boat operator.

16. The marine engine drainage system of claim 8, comprising a through hull installation of said drainage device in which said control console monitors said sensors and actuates the drainage device electronically, draining the engine water every time the engine is turned off, prompting boat operator action only in the event of a malfunction, and is operable for alerting the operators as to whether:
- the engine cooling system is functioning properly during normal operation of the boat engine;
- all parts of the drainage system are functioning properly before the drainage device is actuated;
- all of the water has drained from the engine cooling system after the drainage device is actuated; and
- determine which parts of the engine still contain water should the drainage system malfunction.

* * * * *